Oct. 14, 1947.　　　　G. E. RIEDER　　　　2,429,108
FRUIT AND VEGETABLE CUTTER INCLUDING A PIVOTED
FRAME HAVING DETACHABLE BLADES
Filed Sept. 13, 1945　　　　4 Sheets-Sheet 1
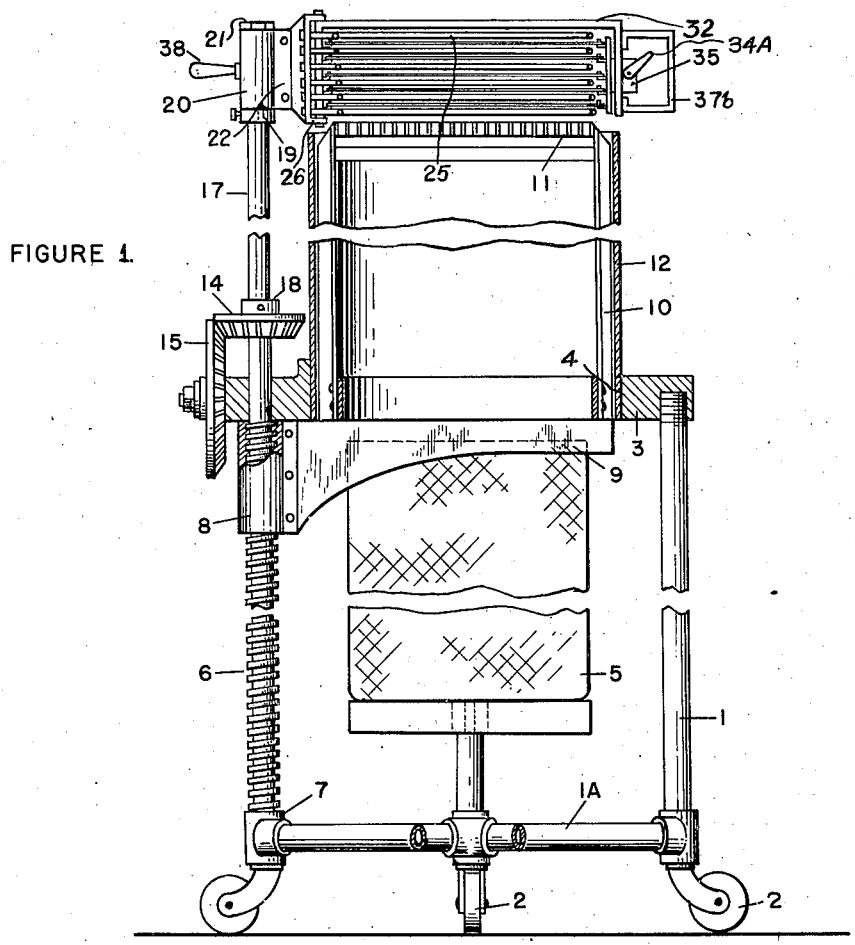
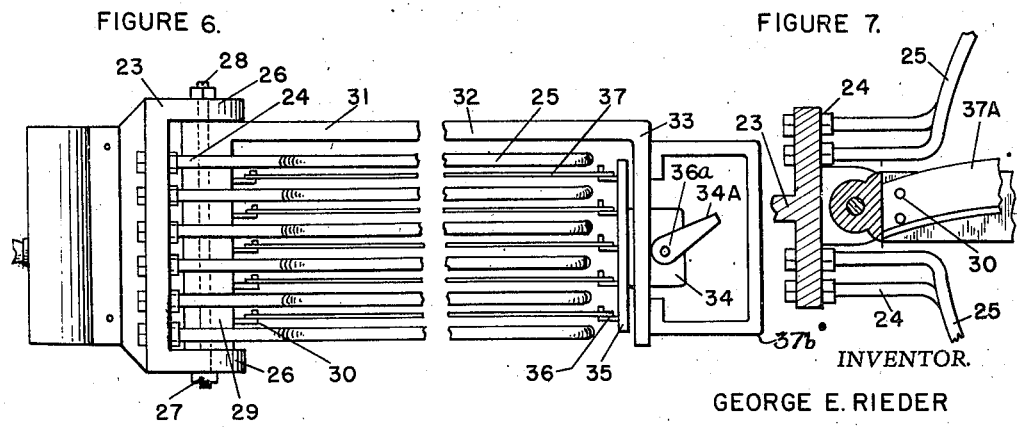
INVENTOR.
GEORGE E. RIEDER
BY *Victor J. Evans & Co.*
ATTORNEYS

INVENTOR.
GEORGE E. RIEDER

Oct. 14, 1947.  G. E. RIEDER  2,429,108
FRUIT AND VEGETABLE CUTTER INCLUDING A PIVOTED
FRAME HAVING DETACHABLE BLADES
Filed Sept. 13, 1945  4 Sheets-Sheet 3
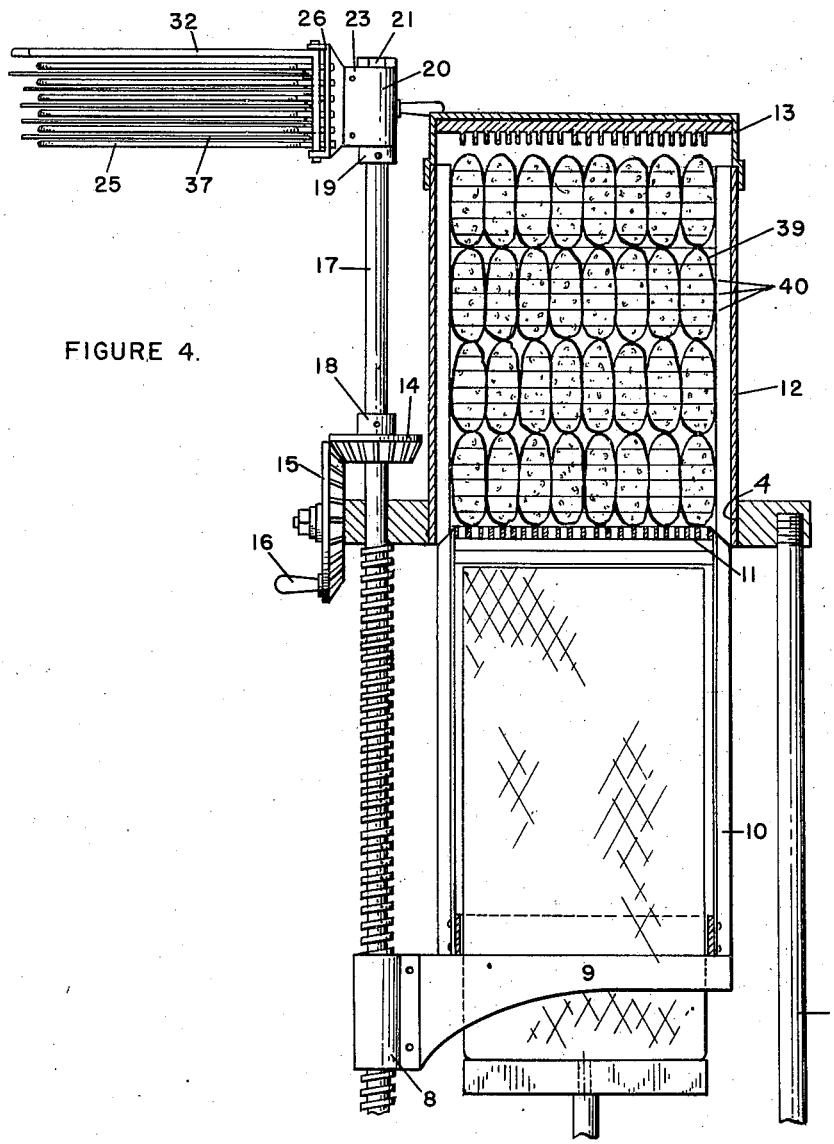
FIGURE 4.
FIGURE 5.
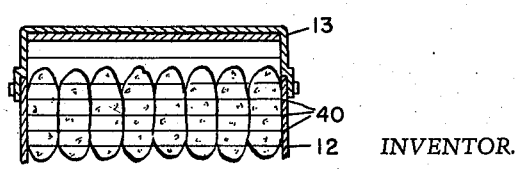
INVENTOR.
GEORGE E. RIEDER
BY *Victor J. Evans & Co.*
ATTORNEYS

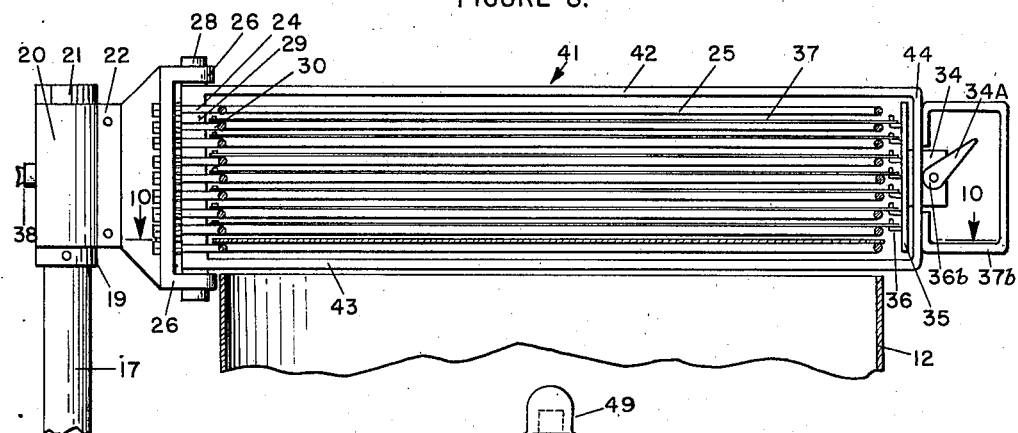
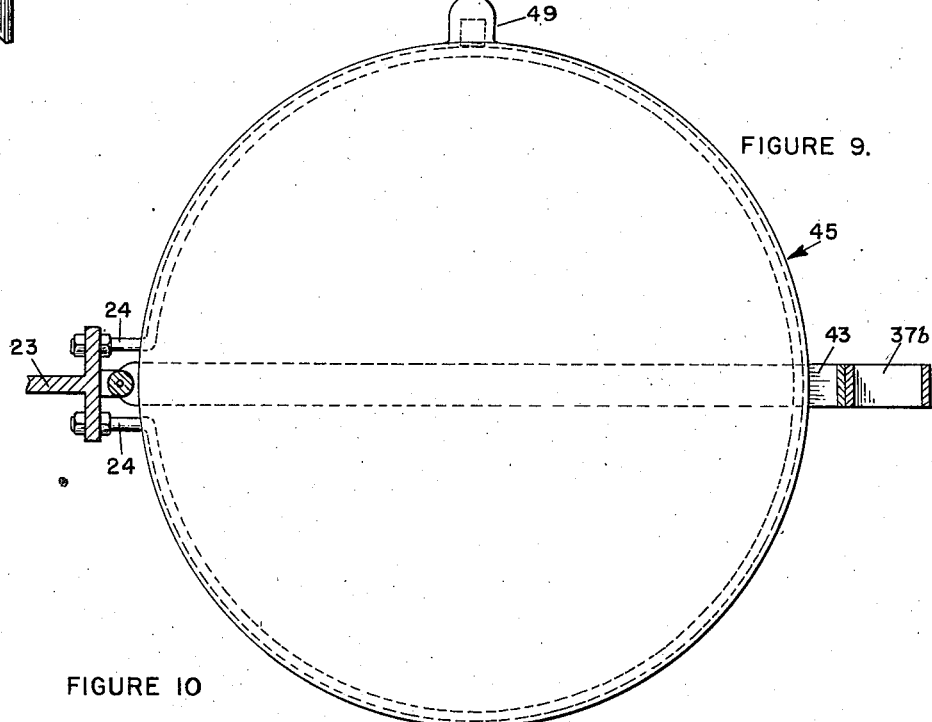
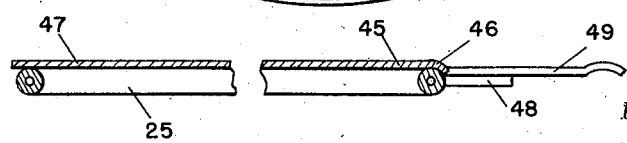
INVENTOR.
GEORGE E. RIEDER

Patented Oct. 14, 1947

2,429,108

UNITED STATES PATENT OFFICE 2,429,108

FRUIT AND VEGETABLE CUTTER, INCLUDING A PIVOTED FRAME HAVING DETACHABLE BLADES

George E. Rieder, Houston, Tex.

Application September 13, 1945, Serial No. 615,947

8 Claims. (Cl. 146—147)

My present invention, in its broad aspect, has to do with improvements in slicing apparatus for use with fruits, vegetables and the like, and is an accessory designed to be used with the structure of my Patent #2,219,963 wherein there is defined a combination cubing and dicing apparatus for fruits, vegetables and the like, having a material receiving chamber with a vertically movable blade platform on which the material is deposited. In my prior patent, there is provided a frame formed with tubular standards, a worm gear and drive assembly, a material receiving chamber, a blade platform vertically movable by the worm, a basket, and associated structure. My present invention, is designed to be mounted on the frame of my previously patented structure, and includes a plurality of improved horizontally swingable, uniformly spaced, cutter blades passing through a frame in which the fruits, vegetables, and the like, to be sliced, are supported by a retractible loading tray; the slicing operation having been completed, it is repeated until the material receiving chamber of the structure of my previous patent is filled or charged. Among the improved features of my present invention are: (1) the multiple blades are spaced and swingably supported as a unit and the details of the blades and supporting structure are novel and improved, (2) the tubular spaced frame members which carry the fruits, vegetables and the like, and through the interstices of which the blades pass is improved, and is sturdy and practical, and (3) the operation of my present invention, the manner of associating it with my previously patented structure, and the form and construction of my loading trays and other details of my invention are unique and improved and are designed for practical operation, ready cleaning and repair, and for use where large quantities of fruits, vegetables and the like are required to be processed.

Other and equally important objects and advantages of my invention will be apparent from the following description and drawings, but it is to be understood that changes in form, size, shape, materials, construction and arrangement of parts are within my broad inventive concept and the scope of the appended claims.

In the drawings wherein I have illustrated a preferred form of my invention—

Figure 1 is a side elevation of my invention associated with the structure of my prior Patent #2,219,963;

Figure 4 is a side view of my device, partly in section with the material receiving chamber filled;

Figure 5 is a view of the top of the material receiving chamber with the top placed thereon preparatory to the cubing and dicing operation performed by the structure of my prior patent;

Figure 6 is a detail of my slicing or cutter blades and frame members and supports per se;

Figure 7 is a detail of the manner of mounting the cutting and slicing blades;

Figure 8 is a detail view of my slicing or cutter blades, the use of a frame, having upper and lower horizontal bars and end bar bent to form a substantially U-shaped frame;

Figure 9 is a top plan view of my retractible loading tray which is adapted to be removably attached to the knife frame, and Figure 10 is an enlarged detailed view of the handle being attached thereto on the line 10—10 of Figure 8.

In the drawings wherein like characters of reference are used to designate like or similar parts throughout the several views:

Figure 2:
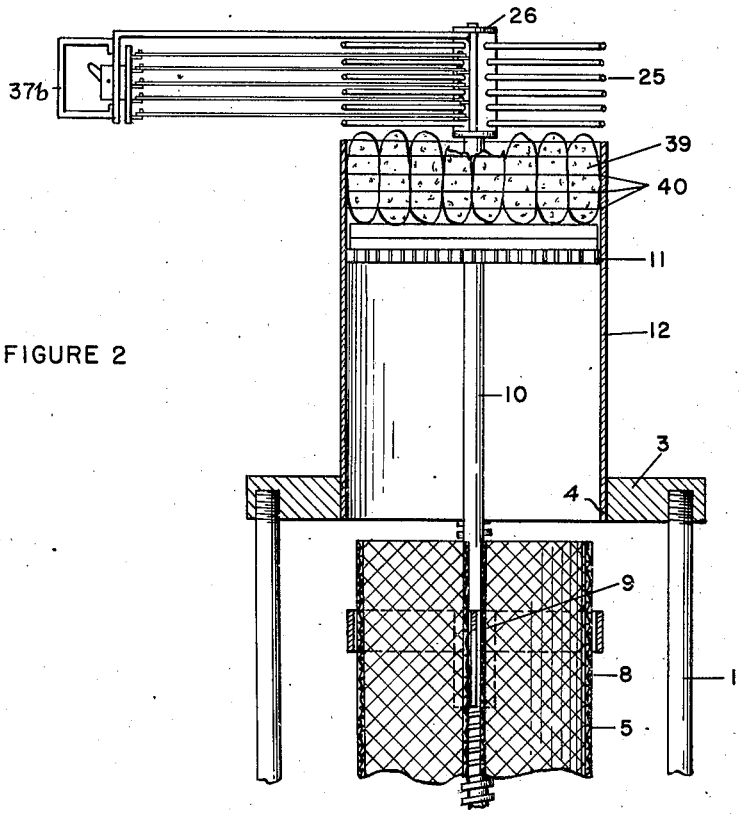
Figure 2 is a front view of the same with material therein which has been sliced and lowered into the material receiving chamber preparatory to another operation.
Figure 3:
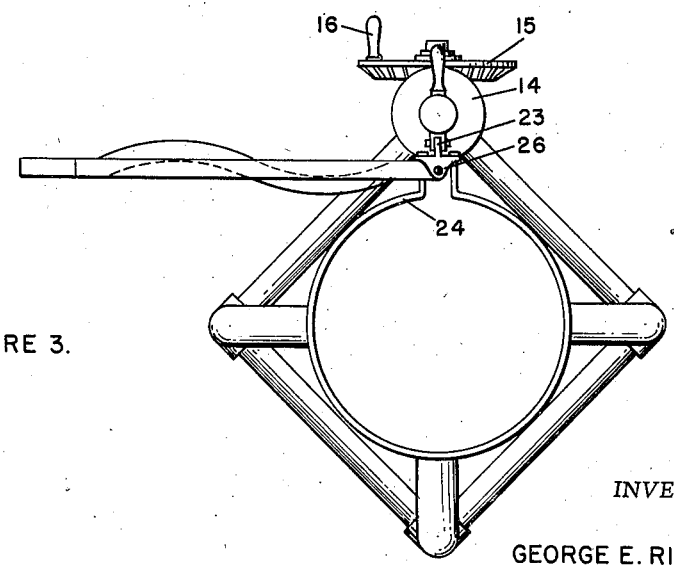
Figure 3 is a top plan view.

The structure of my prior patented device #2,219,963 may be generally described as comprising a frame formed with four vertical, tubular standards 1 carrying casters 2 at their lower ends and lower cross pieces 1a above the casters. The frame has a top 3 formed with a circular center opening 4 beneath which is mounted the reticulated receiving hopper 5. One corner of the frame is supported by a worm gear 6 rotatably mounted in the top 3 and the sleeve 7 which is engaged by a traveler 8 on the circular frame 9 connecting with the opposed supporting standards 10 of my cubing or dicing knife platform 11 which moves upwardly and downwardly in the material receiving chamber or compartment 12 attached in the opening 4 of the top 3 above the hopper 5 and which has a top 13 as shown in Figure 5. Operation of the worm gear 6 through intermeshing beveled gears 14 and 15 and handle 16 on gear 15 moves the cubing and dicing platform in the material receiving chamber to cube or dice the material therein.

My present invention is designed to be supported upon and to operate in conjunction with the foregoing structure, and comprises a vertical shaft 17 seated and pinned at one end in a collar 18 on the gear 14 and which has pinned thereto at a point spaced from its upper end a bearing collar 19. Mounted on the upper end of the shaft 17 and seating on the collar 19 is a sleeve 20 which is held in place by a nut 21. The sleeve has spaced vertical parallel lateral extensions 22 between which is bolted the T-shaped bracket 23 to present its flat face laterally and in a vertical plane as shown in Figures 1 and 7. The bracket 23 has a plurality of aligned openings vertically spaced apart to receive the ends 24 of circular tubular frame member 25, as shown in Figure 7, and at the top and bottom of the T-shaped bracket 23 are spaced parallel, lateral lips 26 having openings 27 constituting bearings for a pin 28 on which is pivotally mounted a bearing 29 having spaced hook-shaped fingers 30. Connected with the bearing 29 is the knife supporting frame 31 having a horizontal bar 32 and an end bar 33. The end bar has a slot in which is received the extension 34 of a knife supporting plate 35 having hook-shaped fingers 36 corresponding to fingers 30.

My knives 37 are curved and edged as at 37a and each has an end opening through which complementary pairs of fingers 30 and 36 extend to mount the knives in a horizontal position to swing between the frame members 25 as shown in Figure 6. The extension 34 passes through the end bar 33 and has pivoted thereon a handle 34a having an eccentric head 36a adapted to bear against the end as in Figure 6 to move the plate 35 to rigidly hold the knives in place. The knives, however, are removable by releasing movement of the handle and eccentric head 36a. A handle 37b is provided on the end bar 33 and another handle 38 is provided on the sleeve 20 so that the sleeve may be pivoted on the shaft 17 to swing the frame aside, and the knife frame may be pivoted on the pin 28 to move the knives with respect to the frame. The frame is filled with fruits, vegetables or the like 39 in layers and the knives passed through the same to form slices 40. In filling the frame, the platform 11 is moved to the top position to form a floor under the frame, and after the first layer is cut, the platform is moved down to accommodate the next layer on top of the first, which position is shown in Figure 2, and the operation is completed until the receiving chamber 12 is filled as shown in Figure 4. The top 13 is then placed on the chamber 12 and the dicing and cubing operation carried out, or if desired, this operation may be omitted and the material used in a sliced condition, such for instance as, sliced tomatoes.

In Figure 8, the knife supporting frame 41 comprises integral horizontal bars 42 and 43, respectively, and an end bar 44 bent to form the substantially U-shaped frame 41. The end bar 44 has a slot in which is received the extension 34 of the knife supporting plate 35 having the hooked shaped fingers 36 corresponding to fingers 30.

The formation of a U-shaped frame including the lower horizontal bar 43 stabilizes the knife frame against distortion of the cutting blades when passed through the fruits, vegetables or the like.

In the form of my invention shown in Figure 8, a retractible removable loading tray 45 is used in conjunction with the knife frame 41.

The tray 45 has a circular flange 46 formed on the periphery thereof except at the point which remains straight in order that it may be received over the ends 24 of the frame member 25 and be easily removed from the circular tubular frame member 25 upon which it is supported. The tray 45 is provided with a tray stop 48 which is welded to the lower surface of the apertured handle lug 49 formed integral with the tray 45 and contacts the member 25 to properly position the tray thereon.

In use, the tray is positioned on the lowermost member 25 and retains the fruits and vegetables thereon in the chamber or compartment 12 during the slicing thereof. After this operation has been completed, the tray is swung clear and the sliced fruits and vegetables are deposited on the platform 11 and the operation is completed, as previously described.

Thus, the tray 45 performs the function of the platform 11 as previously described as well as supporting the fruits and vegetables while being sliced.

From the foregoing, it is believed that the operation and advantages of my invention will be apparent, but it is again emphasized that interpretation of the scope of my invention should only be conclusive when made in the light of the subjoined claims.

I claim:

1. A slicing device for foodstuffs, comprising a vertical support, a sleeve mounted for rotation on the support, a T-shaped bracket fixed to the sleeve, and having openings therein, a plurality of circular spaced frame elements fixed in the openings of the bracket, ears on the bracket, a frame pivoted between the ears, and a plurality of knives arranged in parallel, superposed spaced apart relationship in the frame to swing between the frame members.

2. The invention as defined in claim 1 wherein the knives are removably supported in the frame, and eccentric clamping means are provided for fixing the blades therein.

3. The invention as defined in claim 1 wherein the frame has a horizontal and an end bar formed with a slot, a plate, an extension on the plate receivable in the slot and carrying a pivoted handle, hooks on the plate engaging ends of the blades, and an eccentric head on the handle clamping against the end bar to clamp the knives in place.

4. The invention as defined in claim 1 wherein the frame is substantially U-shaped having upper and lower horizontal bars and an end bar intermediate said bars, said end bar being formed with a slot, a plate, an extension on the plate receivable in the slot and carrying a pivoted handle, hooks on the plate engaging ends of the blades and an eccentric head on the handle clamping against the end bar to clamp the knives in place.

5. The invention as in claim 1 wherein the pivoted frame has opposed series of hook-like members, and the knives have openings to receive the same, and means are provided for moving the hook-like members to tighten the hold on the knives to support the same, said latter means including the hook-like members and an eccentric clamp for moving the hook-like members.

6. The invention as defined in claim 1 wherein the frame is formed with tubular circularly formed spaced members positioned on a plane between the knives.

7. The invention as defined in claim 1 wherein a retractible loading tray is mounted on one of said circular frame elements.

8. The invention as defined in claim 1 wherein the knives and frame are either jointly or independently and relatively swingable to slice material carried in the frame, and wherein means are provided for independently operating the knives or the frame.

GEORGE E. RIEDER.

REFERENCES CITED

The following references are of record in the file of this patent:

UNITED STATES PATENTS

| Number | Name | Date |
|---|---|---|
| 283,686 | Tripp | Aug. 21, 1883 |
| 681,912 | Gibbons | Sept. 3, 1901 |
| 1,041,221 | Wyatt | Oct. 15, 1912 |
| 1,430,049 | Applegate | Sept. 26, 1922 |
| 2,018,750 | Vogt | Oct. 29, 1935 |
| 2,219,963 | Rieder | Oct. 29, 1940 |